(12) United States Patent
Peterson et al.

(10) Patent No.: US 7,426,894 B2
(45) Date of Patent: Sep. 23, 2008

(54) SMOOTH FLOW SEED TUBE FOR AGRICULTURAL PLANTERS

(75) Inventors: Bruce D. Peterson, Lindsborg, KS (US); Brent W. Nelson, Falun, KS (US)

(73) Assignee: Great Plains Manufacturing, Inc., Salina, KS (US)

( * ) Notice: Subject to any disclaimer, the term of this patent is extended or adjusted under 35 U.S.C. 154(b) by 0 days.

(21) Appl. No.: 11/776,431

(22) Filed: Jul. 11, 2007

(65) Prior Publication Data

US 2008/0011209 A1    Jan. 17, 2008

Related U.S. Application Data

(60) Provisional application No. 60/830,933, filed on Jul. 14, 2006.

(51) Int. Cl.
*A01C 7/00* (2006.01)
*A01C 9/00* (2006.01)

(52) U.S. Cl. ........................ 111/174; 111/903

(58) Field of Classification Search ................. 111/170, 111/174, 200, 903, 904
See application file for complete search history.

(56) References Cited

U.S. PATENT DOCUMENTS

| | | | |
|---|---|---|---|
| 4,157,468 A | | 6/1979 | Primiano |
| 4,162,744 A | * | 7/1979 | Barker et al. ................. 221/251 |
| 4,431,257 A | * | 2/1984 | Born ........................... 359/358 |
| 4,915,258 A | * | 4/1990 | Olson .......................... 221/211 |
| 5,533,458 A | | 7/1996 | Bergland et al. |
| 5,607,225 A | * | 3/1997 | Halvatzis ..................... 362/125 |
| 5,650,609 A | | 7/1997 | Mertins et al. |
| 5,883,383 A | | 3/1999 | Dragne |
| 6,332,413 B1 | | 12/2001 | Stufflebeanm et al. |
| 7,004,090 B2 | * | 2/2006 | Swanson ..................... 111/119 |
| 2007/0084387 A1 | | 4/2007 | Mariman et al. |

OTHER PUBLICATIONS

"Bullseye Seed Tube" advertisement, Successful Farming, Jan. 2007.

* cited by examiner

*Primary Examiner*—Christopher J. Novosad
(74) *Attorney, Agent, or Firm*—Jeffrey L. Thompson; Thompson & Thompson, P.A.

(57) ABSTRACT

A seed tube for an agricultural planter has a top entrance, a bottom exit, front and rear walls, and sidewalls. A lower seed tube locator fits around the main body of the seed tube as a separate component and provides a lower attachment point for the seed tube. The front wall of the seed tube is free of substantial molded structures that would tend to create a sink or warp the interior surface of the front wall during molding. A sensor is mounted to the seed tube to face an exterior surface of the front wall. Light is transmitted and received by the sensor through the front wall to detect seeds passing through the seed tube. The interior surface of the front wall is smooth, uninterrupted and sink-free to avoid any obstructions that might alter the trajectory of the falling seeds, thereby increasing the seed spacing accuracy of the planter.

22 Claims, 4 Drawing Sheets

SMOOTH FLOW SEED TUBE FOR AGRICULTURAL PLANTERS

RELATED APPLICATIONS

This application claims priority of U.S. Provisional Application No. 60/830,933 filed on Jul. 14, 2006. The content of this prior application is incorporated herein by reference.

BACKGROUND OF THE INVENTION

1. Field of the Invention

The present invention relates generally to agricultural planters having sensors for counting seeds as the seeds are dropped from a seed metering mechanism. In particular, the present invention relates to improvements in seed tubes and sensor arrangements for use with such agricultural planters.

2. Description of the Related Art

There are several styles of seed meters used on agriculture equipment manufactured today. A lot of time and expense are spent on getting perfect seed spacing out of the meter, which is intended to give perfect plant-to-plant spacing in the field in order to maximize yields. To get perfect plant spacing, each seed has to be singulated and then released from the meter at a precise, repeatable time. A seed tube is used on these planters to guide and protect the seed on it's journey from the seed meter to the open furrow in the ground.

The seed dropping out of the seed meters is typically monitored by a seed sensor, usually an electric eye that can detect a seed as it passes by. Some of the early sensors were used to detect blockage or to detect the absence of seed. As improvements were made, the sensors were able to count individual seeds and give a farmer planting population feedback.

In the past few years, some sensors and the supporting software have the ability to do live statistical analysis on the seed, giving the operator a very accurate look into the quality of the seed spacing.

The seed sensor is typically mounted on the seed tube about half way between the seed entrance end (seed meter) and the exit end (ground). The basic seed tube sensor has two components, a transmitter and a receiver. Light is typically transmitted through a hole in the back of the seed tube and is detected through a hole in the front of the seed tube.

One of the challenges in implementing this type of sensor is to make sure the sensor itself does not hit the seed and cause disruptions to the seed spacing. The Applicants have discovered that conventional seed sensors often have slight imperfections that affect the seed trajectory as the seed travels through the seed tube, and thus have an effect on seed spacing out the bottom of the seed tube.

With the aid of the latest sensor equipment, the Applicants have monitored and developed statistics on the seed spacing coming out of the meter, and again at the bottom of the seed tube (ground). The Applicants found that the sensors used in conventional planter seed tubes were causing seed spacing problems at the exit end of the seed tube.

Sensors on the seed tubes can cause spacing problems for the following reasons. A "perfect" seed meter introduces seeds into the top of the seed tube that are perfectly spaced. The seeds fall to the ground at the same speed and have the same trajectory inside the seed tube. The distance between the seeds must be maintained inside the seed tube so that the seeds exit the seed tube with this same perfect spacing. If a seed hits or glances off even the slightest obstruction, the trajectory of the seed is altered and the seed takes longer to reach the bottom exit of the tube. Any seed that deviates from the path of the majority of the seeds is delayed and can be detected with modern sensor equipment. These small delays also cause irregular plant spacing in the field, which has been shown to cause yield loss. If this delay is great enough, the seed will lag and arrive at the exit at the same time as the next seed resulting in a "double" and leaving the seed's intended place in the field empty.

There have been attempts over the years to solve this problem, including the following:

1. Ramp. A ramp system for a seed tube is described in U.S. Pat. No. 5,533,458 issued to Bergland et al., which causes the seed to jump over and never make contact with the imperfections on the sensor face.

2. Setback. A setback arrangement for a seed tube is described in U.S. Pat. No. 6,332,413 issued to Stufflebeanm et al., in which the sensor and the entire lower portion of the seed tube are shifted so the seed becomes airborne for a brief time and never makes contact with the seed sensor face.

3. Smooth face. The sensor is manufactured with a smooth face and inserted in a hole in the seed tube. By controlling the wall thickness of the seed tube and the height of the sensor's face, the face ends up flush with the inside surface of the seed tube.

4. Transparent seed tube. A transparent seed tube is described in U.S. Patent Publication No. 2007/0084387 of Mariman et al. A transmitter of the sensor is positioned outside of the transparent side wall and operates through the transparent material.

The first and second attempted solutions described above tend to degrade the spacing due to an introduction of an extra bounce to get the seed over the sensor.

The third and fourth attempted solutions described above are attempts to provide a smoother inside surface of the seed tube. However, with respect to the third attempted solution, it is difficult to manufacture a smooth sensor face, and difficult to insert the sensor so it ends up exactly flush with the inside wall of the seed tube. All dimensions involved have to be held in very close tolerance to make this system work. Gaps, steps, and ledges, no matter how small, can cause spacing problems. As an example, a piece of transparent tape on the inside of the seed tube is enough of a bump to cause problems.

The transparent seed tube described in Mariman et al.'s '387 publication offers a partial solution to the problems described above. However, Mariman et al.'s seed tube includes a conventional lower locator hook molded into the front wall of the seed tube body. The conventional hook tends to create a sink and warp the interior surface of the front wall of the seed tube during manufacture. As a result, the interior surface of the front wall of Mariman et al.'s seed tube is not smooth and uninterrupted. Mariman et al.'s seed tube also has a substantial sensor pocket and mounting structure molded into the front wall for positioning the sensor, which may cause additional sinking and warping on the interior surface during the molding process.

Thus, there is a need in the industry for an improved seed tube and sensor assembly to improve seed spacing in an agricultural planter.

SUMMARY OF THE INVENTION

A seed tube for an agricultural planter according to the present invention has a top entrance for receiving seeds from a seed metering mechanism, a bottom exit through which seeds are discharged into a furrow in the ground, front and rear walls, and sidewalls connecting the front and rear walls. A main body of the seed tube is formed as a single molded component. A lower seed tube locator fits around the main body of the seed tube as a separate component and provides a lower attachment point for the seed tube. The front wall of the seed tube is free of substantial molded structures that would tend to create a sink or warp the interior surface of the front wall during the molding process. A sensor is mounted on the seed tube and arranged to face an exterior surface of the front wall. The sensor is kept outside of the seed tube, and light is transmitted and received by the sensor through the front wall to detect seeds passing through the seed tube. As a result of this construction, the interior surface of the front wall can be molded as a smooth, uninterrupted and sink-free surface to avoid any obstructions that might alter the trajectory of the falling seeds, thereby increasing the seed spacing accuracy of the planter.

In accordance with an aspect of the present invention, a seed tube for use on an agricultural planter is provided, comprising: a top entrance for receiving seeds from a seed meter; a bottom exit through which seeds are discharged into a furrow in the ground; and a front wall between the top entrance and the bottom exit having a smooth, uninterrupted, sink-free interior surface formed of a transparent material. A lower seed tube locator fits around the seed tube as a separate component and provides a lower attachment point for the seed tube to ensure that a sink-free interior surface is created on the front wall of the seed tube.

In accordance with another aspect of the present invention, a seed tube and sensor assembly for an agricultural planter is provided, comprising: a seed tube having a top entrance for receiving seeds from a seed meter, a bottom exit through which seeds are discharged into a furrow in the ground, front and rear walls between the top entrance and the bottom exit, and sidewalls connecting the front and rear walls, and the front wall comprises a smooth, uninterrupted, sink-free interior surface formed of a transparent material. A first sensor component is positioned on a front side of the seed tube, the first sensor component having a light transmitter or light receiver arranged to face an exterior surface of the front wall for transmitting or receiving light through the front wall to detect seeds passing through the seed tube. A lower seed tube locator fits around the main body of the seed tube as a separate component and provides a lower attachment point for the seed tube to ensure that a sink-free interior surface is created on the front wall of the seed tube.

In accordance with yet another aspect of the present invention, an agricultural planter is provided, comprising: a seed metering mechanism for metering seeds from a seed supply; a furrow opener for creating a furrow in the ground; a seed tube having a top entrance arranged to receive seeds from the seed metering mechanism, and a bottom exit through which seeds are discharged into the furrow created by the furrow opener, the seed tube being arranged to slope downwardly and rearwardly from the top entrance so that the bottom exit is located below and behind the top entrance; and first and second sensor components positioned on front and rear sides of the seed tube, respectively, for transmitting and receiving light through the seed tube to detect seeds passing through the seed tube. The seed tube has a front wall comprising a smooth, uninterrupted, sink-free interior surface formed of a transparent material, and the first sensor component has a light transmitter or light receiver arranged to face an exterior surface of the front wall for transmitting or receiving light through the front wall without disruption to the seeds passing through the seed tube. A lower seed tube locator fits around the main body of the seed tube as a separate component and provides a lower attachment point for the seed tube to ensure that a sink-free interior surface is created on the front wall of the seed tube.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings.

DETAILED DESCRIPTION OF THE INVENTION

A seed tube 10 for an agricultural planter according to the present invention will be described with reference to FIGS. 1 to 11 of the accompanying drawings.

Agricultural planters typically have seed metering mechanisms associated with each planter row for metering seeds from a seed supply (e.g., a hopper). The seed metering mechanisms operate to singulate seeds from the seed supply so that a desired number of seeds per acre are metered and dropped at a uniform rate by the planter. Several types of seed metering mechanisms are known in the art, and the present invention is not limited to use with any particular seed metering mechanism.

Planters also have furrow openers associated with each planter row for creating a seed furrow in the ground, and various other components that will not be described in detail herein but which are known to those skilled in the art.

Seed tubes 10 are used with each planter row to guide seeds from the metering mechanism into the seed furrow. Each seed tube 10 has a top entrance 11 arranged to receive seeds S from the seed metering mechanism, and a bottom exit 12 through which seeds are discharged into the furrow created by the furrow opener. The seed tubes 10 are normally arranged to slope downwardly and rearwardly from the top entrance 11 so that the bottom exit 12 is located below and behind the top entrance 11. The rearward slope helps to prevent bouncing of the seed S when it exits the seed tube into the seed furrow because the rearward movement of the seed within the seed tube 10 counteracts the forward motion of the planter, thereby leaving the seed with only a small, if any, horizontal velocity relative to the ground as it exits the seed tube 10.

The seed tube 10 of the present invention has front and rear walls 13, 14 between the top entrance 11 and the bottom exit 12, and sidewalls 15, 16 connecting the front and rear walls 13, 14. The front wall 13 has a smooth, uninterrupted and sink-free interior surface 17 formed of a transparent material. The front wall 13, sidewalls 15, 16, and a lower portion 18 of the rear wall 14 are integrally molded to form the main body 19 of the seed tube 10. In one embodiment, the entire main body 19 is formed of a transparent material to facilitate construction.

In another embodiment, a portion of the front wall 13 is formed of a transparent material, while the remainder of the front wall 13 and other parts of the main body 19 are formed of a nontransparent material. This embodiment can be made using a dual material injection molding process where the area right around the sensor would be transparent, and the rest of the seed tube 10 would be nontransparent. The drawback of this embodiment is the added manufacturing cost of using a specialized dual material injection molding machine.

First and second sensor components 20, 21 are mounted on the front and rear sides of the seed tube 10, respectively. In one embodiment, the first sensor component 20 is mounted on the front side of the seed tube 10 for receiving light transmitted through the seed tube 10 by the second sensor component 21. In another embodiment, the first sensor component 20 is a light transmitter, while the second sensor component 21 is a light receiver. The first and second sensor components 20, 21 are arranged for transmitting and receiving light through a cross section of the seed tube 10 to detect seeds S passing through the seed tube 10. The sensor components 20, 21 can be secured to the seed tube 10 in a conventional manner using plastic ties or other suitable fastening structures. Alternatively, the sensor components 20, 21 can be mounted to a separate sleeve (not shown) or other structure that is not directly attached to the seed tube 10, but which places the sensor components 20, 21 in the desired locations on the front and rear sides of the seed tube 10.

The first sensor component 20 has its light receiver/transmitter 22 arranged to face an exterior surface 23 of the front wall 13 for receiving or transmitting light through the front wall 13 without disrupting the seeds S passing through the seed tube 10. The second sensor component 21 has its light transmitter/receiver 24 arranged to face the first sensor component 20 on the rear side of the seed tube 10 for transmitting or receiving light through the interior of the seed tube 10 and the front wall 13.

The transparent material of the seed tube 10 can be any material through which light can be transmitted for effective operation of the seed sensor. For a sensor that transmits and receives in the infrared portion of the electromagnetic spectrum, the seed tube 10 will be formed of a material that transmits infrared light. Such materials may include, for example, urethane, acrylics and other plastics. The seed tube material can be colored while still maintaining its transparency to infrared light. The infrared wavelength can pass through colored plastics that the human eye cannot see through. However, the Applicants have determined that carbon black colorant in the plastic material will impede transmission of infrared light and, if used at high enough concentrations, will prevent the infrared sensors from working properly.

Other types of sensors may also be used with the seed tube 10 of the present invention. For example, a sensor that transmits and receives light in the visible portion of the electromagnetic spectrum can be used. In this case, the seed tube 10 would need to be made of a transparent material with little or no colorant, i.e., transparent to the human eye. The structure and function of the seed tube 10 would otherwise remain the same.

The seed tube 10 has a locator structure 25 formed on the exterior surface 23 of the front wall 13. The locator structure 25 is used for locating and maintaining the first sensor component 20 on the exterior surface 23 of the front wall 13 with its light receiver/transmitter 22 facing the second sensor component 21. In the illustrated embodiment, the locator structure 25 includes a raised ring segment 25a, a pair of upper sensor mount tabs 25b, and a pair of lower sensor mount tabs 25c, all of which are molded on the exterior surface 23 of the front wall 13. The raised ring segment 25 functions to prevent moisture and debris from accumulating between the exterior surface 23 and the light receiver/transmitter 22 of the first sensor component 20.

The upper and lower sensor mount tabs 25b, 25c function to support the body of the first sensor component 20 at a desired angle relative to the exterior surface 23 of the front wall 13 of the seed tube 10 (e.g., the upper sensor mount tabs 25b protrude further than the lower sensor mount tabs 25c in the illustrated example). The upper sensor mount tabs 25b have tapered side engaging surfaces that function to center the first sensor component 20 between the upper sensor mount tabs 25b and thereby prevent side-to-side movement of the sensor component 20 after it is attached to the seed tube 10. The upper and lower sensor mount tabs 25b, 25c are formed as a plurality of thin separate protrusions on right and left sides of the exterior surface 23 of the front wall 13 of the seed tube 10 and require only a small amount of molded material, none of which is located at the centerline of the seed tube 10.

An egress opening 26 is provided at the bottom of the raised ring segment 25a for allowing debris and moisture to exit the raised ring segment 25a without becoming trapped around the light receiver/transmitter 22 of the first sensor component 20. The egress opening 26 also reduces the amount of molded material, and avoids a closed shape of molded material, protruding from the exterior surface 23 of the front wall 13 of the seed tube 10. An adhesive material, such as silicone, can be placed between the first sensor component 20 and the front wall 13 of the seed tube 10 (within the area defined by the raised ring segment 25a) to ensure a tight, dust-free fit between the exterior surface 23 of the seed tube 10 and the first sensor component 20.

The raised ring segment 25a, upper sensor mount tabs 25b, and lower sensor mount tabs 25c are formed as thin protrusions using only a small amount of molded material with very little, if any, of the protruding material located at the centerline of the seed tube 10. Also, none of the raised ring segment 25a, upper sensor mount tabs 25b or lower sensor mount tabs 25c are connected with each other or form a closed geometric shape. As a result, the seed tube main body 19 can be produced in a molding process without shrinkage and sink formation on the interior surface 17 of the seed tube 10 to achieve a smooth, continuous, uninterrupted and sink-free interior surface 17.

An upper portion 27 of the rear wall 14 is formed as a separate component and is attached to the main body 19 during assembly. For example, the upper portion 27 of the rear wall 14 can be attached to the rear edges 28 of the sidewalls 15, 16 of the seed tube main body 19 using a mating coupler 29 and/or a suitable adhesive or weld.

The open rear side 30 and tapered shape of the main seed tube body 19 allows an injection mold tooling core 31 to be removed from the interior of the seed tube body 19 during the molding process. The lower portion 18 of the rear wall 14 is molded integrally with the seed tube main body 19 to provide a more durable construction that maintains its shape better than would be the case if the entire rear wall 14 were formed separately. The front side 32 of the tooling core 31 has a smooth surface that ensures that the interior surface 17 of the front wall 13 of the seed tube 10 is provided as a smooth, continuous and uninterrupted surface.

The second sensor component 21 is attached to the upper portion 27 of the rear wall 14 by inserting the face of the sensor component into an opening 33 or other locator structure formed on the rear wall 14, as shown in the drawings. In another embodiment, a locator ring can be formed on the exterior surface of the rear wall 14 for locating the second sensor component 21 in a manner similar to the front wall 13. However, the second sensor component 21 mounted on the rear wall 14 of the seed tube 10 need not be mounted in a manner that creates a smooth interior surface on the rear wall 14 because the seeds S falling through the seed tube 10 do not generally contact the rear wall 14. The seed tube 10 is sloped rearwardly and downwardly in such a manner that the seeds S typically only contact the front wall 13 as they pass from the seed metering mechanism along the length of the seed tube 10 and into the furrow.

The seed tube 10 has upper and lower attachment structures that are provided at industry standard attachment points to fit existing planters. The upper attachment structure 34 is conventional and may include a pair of flanges 35 that protrude forward from the front wall 13 with openings 36 for attaching to a corresponding structure on the planter.

As explained above, an important feature of the present invention is that the interior surface 17 of the front wall 13 of the seed tube 10 is smooth, uninterrupted and sink-free. The present invention achieves this smooth and uninterrupted surface, in part, by eliminating all substantial molded structures on the front wall 13 of the seed tube 10, including the conventional lower attachment hook. By eliminating all substantial molded structures protruding from the exterior surface of the front wall 13 of the seed tube 10, the seed tube 10 can be molded without creating a sink or warping the interior surface 17 of the front wall 13.

Figures 1, 2:
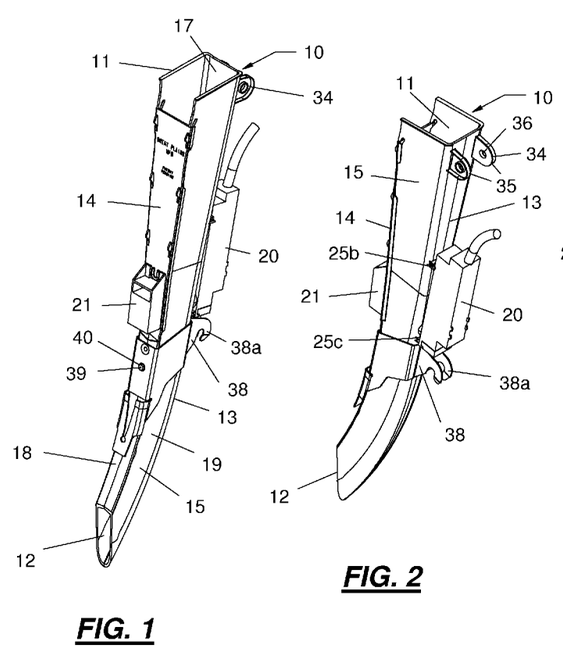
FIG. 1 is a rear perspective view of a seed tube and sensor assembly for an agricultural planter according to the present invention.
FIG. 2 is a front perspective view of the seed tube and sensor assembly shown in FIG. 1.
Figure 3:
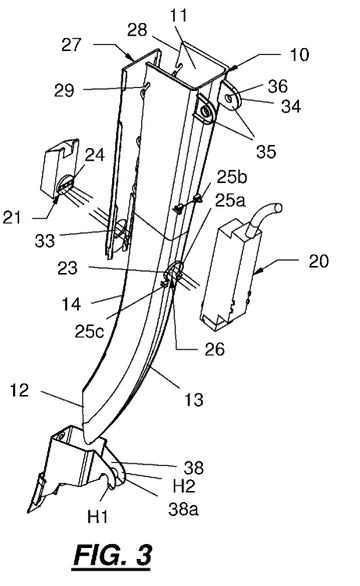
FIG. 3 is an exploded front perspective view of the seed tube and sensor assembly of the present invention.
Figures 4, 5, 6, 7:
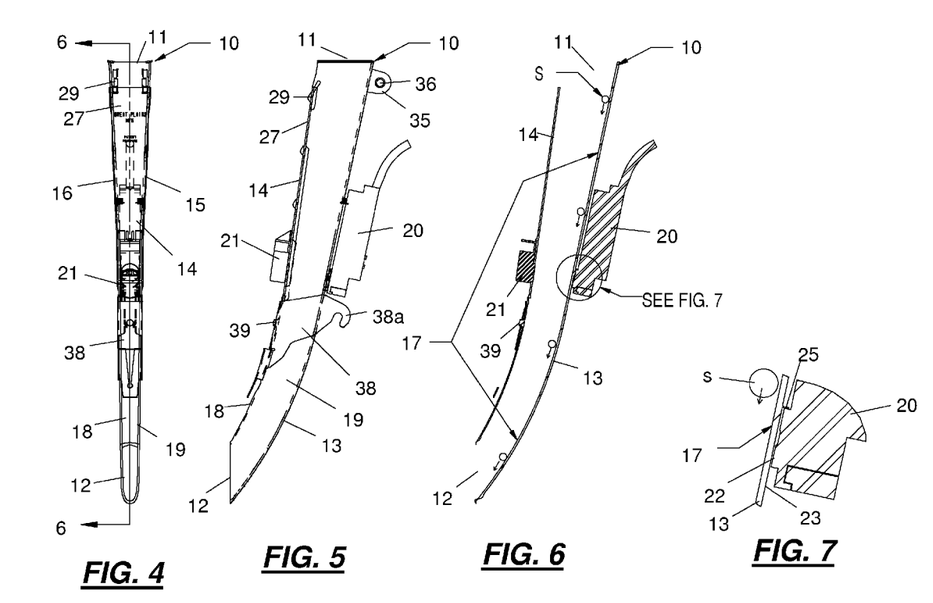
FIG. 4 is a rear view of the seed tube and sensor assembly of the present invention.
FIG. 5 is a side view of the seed tube and sensor assembly of the present invention.
FIG. 6 is a cross section view of the seed tube and sensor assembly of the present invention taken along the line 6-6 in FIG. 4, showing seeds traveling through the seed tube.
FIG. 7 is a detail view in cross section of the portion indicated in FIG. 6.
Figure 8A:
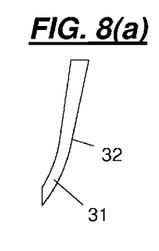
FIGS. 8(a) to 8(e) are side views that show a sequence of molding steps using a single piece injection mold tooling core to form a seed tube main body having a smooth and continuous interior surface.
Figure 8B:
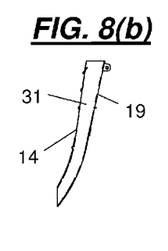
Figures 8C, 8D:
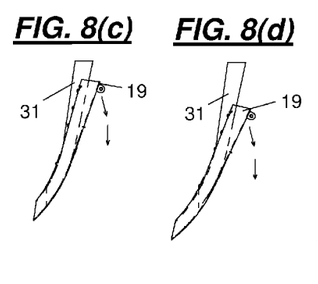
Figure 8E:
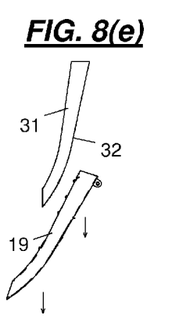
Figure 9A:
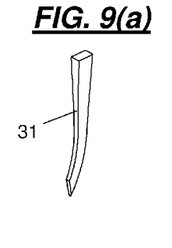
FIGS. 9(a) to 9(e) are rear perspective views of the sequence of molding steps shown in FIGS. 8(a) to 8(e), respectively.
Figure 9B:
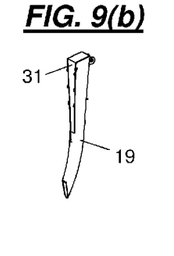
Figure 9C:
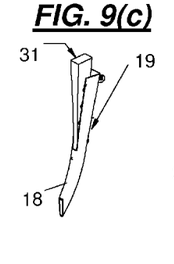
Figure 9D:
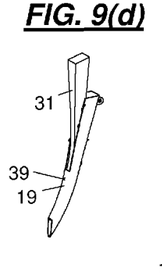
Figure 9E:
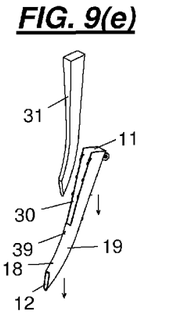
Figure 10:
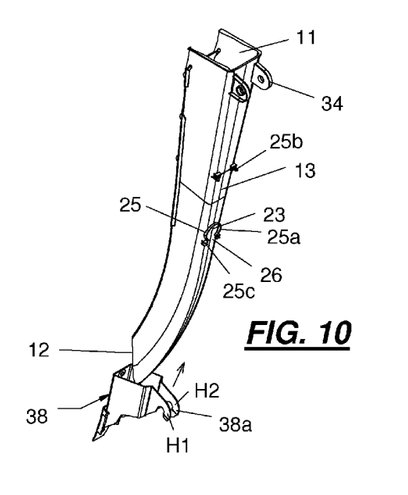
FIG. 10 is a front perspective view of a seed tube showing a separate snap-on hook structure in the process of being installed around the seed tube main body for providing a lower attachment point for the seed tube.
Figure 11:
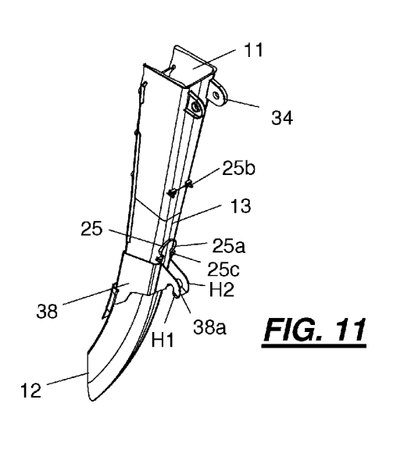
FIG. 11 is a front perspective view of the seed tube shown in FIG. 10 with the snap-on hook structure fit around the seed tube main body.

Instead, the Applicants have developed a lower seed tube locator 38 that is formed separately from the seed tube body 19, as shown in FIGS. 10 and 11. The lower seed tube locator 38 is a snap-on structure that fits around the main body 19 of the seed tube 10 below the sensor components 20, 21 and has a hook 38a formed on its front side to provide the lower attachment point. The snap-on structure 38 can be formed as a metal component for added durability and ease of manufacture, or it can be formed as a separate plastic component.

In the illustrated embodiment, the snap-on structure 38 is a metallic band that fits snugly around a main body of the seed tube. The metallic band 38 has an open front side that allows the metallic band 38 to be spread resiliently during assembly and to squeeze the seed tube main body 19 after assembly. Hook elements H1 and H2 are formed at respective free ends of the metallic band 38 and together form the hook 38a protruding in front of the front wall 13 of the seed tube 10. The hook elements H1, H2 open downwardly to receive a corresponding positioning element on the planter. The snap-on hook structure 38 can be assembled to the seed tube body 19 and held in place by a raised positioning element 39 on the rear wall 14 that mates with a corresponding positioning opening 40 on the rear side of the hook structure 38. The snap-on hook structure 38 avoids the problems associated with the conventional molded structures formed on the front wall of the seed tube and helps guarantee a smooth interior surface 17 on the front wall 13.

In an alternative embodiment (not shown), the lower seed tube locator can be an open weldment, sleeve or other suitable structure attached to or supported by the furrow opener. In this case, the seed tube body 19 could be simply lowered into the lower seed tube locator when the seed tube assembly 10 is installed on the planter, instead of having the lower seed tube locator attached to the seed tube body 19 first. As with the snap-on hook structure 38 described above, this alternative embodiment helps guarantee a smooth interior surface 17 on the front wall 13 by avoiding molded features on the seed tube body 19 that might create a sink or warp the interior surface 17.

The seed tube 10 of the present invention is an improvement over conventional seed tubes because the front wall 13 has a smooth, continuous, uninterrupted and sink-free interior surface 17. There are no windows, ramps or setbacks in the seed tube 10, and there is no need to attempt to install a smooth window for the sensor during the manufacturing process. With the smooth interior design, as long as the tooling is correct and the seed tube 10 is kept in good repair, the seed tube 10 will provide optimum performance regardless of how bad the sensor face gets or how careless the sensor is installed.

While the invention has been specifically described in connection with specific embodiments thereof, it is to be understood that this is by way of illustration and not of limitation, and the scope of the appended claims should be construed as broadly as the prior art will permit.

What is claimed is:

1. A seed tube for use on an agricultural planter, comprising:
   a top entrance for receiving seeds from a seed meter;
   a bottom exit through which seeds are discharged into a furrow in the ground; and
   a front wall between the top entrance and the bottom exit having a smooth, uninterrupted, sink-free interior surface formed of a transparent material.

2. The seed tube according to claim 1, further comprising a lower seed tube locator that fits around the seed tube as a separate component and provides a lower attachment point for the seed tube.

3. The seed tube according to claim 2, wherein said lower seed tube locator comprises a metallic band that fits around a main body of the seed tube and has a positioning element that mates with a corresponding element on the rear wall of the seed tube to secure the seed tube locator in a desired position.

4. The seed tube according to claim 1, further comprising a rear wall between the top entrance and the bottom exit, and sidewalls connecting the front and rear walls, wherein said front wall, said sidewalls, and at least a lower portion of said rear wall are integrally molded to form a main body of the seed tube.

5. The seed tube according to claim 4, wherein said front wall is free of any substantial molded structures protruding from an exterior surface of the front wall that would tend to create a sink or warp the interior surface of the front wall during molding.

6. The seed tube according to claim 1, wherein said transparent material is transparent to infrared light but not to light in the visible portion of the electromagnetic spectrum.

7. The seed tube according to claim 1, wherein said front wall has a sensor locator structure comprising a raised ring segment molded on the exterior surface of the front wall for locating a sensor component, said raised ring segment defining a transparent area through which light can be transmitted or received by a sensor component to detect seeds passing through the seed tube, and said raised ring segment having an egress opening at a bottom side thereof that helps prevent shrinkage and sink formation on the interior surface of the front wall.

8. A seed tube for use on an agricultural planter, comprising:
- a top entrance for receiving seeds from a seed meter;
- a bottom exit through which seeds are discharged into a furrow in the ground; and
- a front wall between the top entrance and the bottom exit;
- further comprising a lower seed tube locator that fits around the seed tube as a separate component and provides a lower attachment point for the seed tube;
- wherein said lower seed tube locator comprises a metallic band that fits around a main body of the seed tube and has a positioning element that mates with a corresponding element on the rear wall of the seed tube to secure the seed tube locator in a desired position; and
- wherein said metallic band has an open front side that allows the metallic band to be spread resiliently during assembly and to squeeze the seed tube main body after assembly.

9. The seed tube according to claim 8, wherein said lower seed tube locator comprises a hook on its front side that protrudes in front of said front wall and opens downwardly to receive a positioning element on a planter.

10. A seed tube for use on an agricultural planter, comprising:
- a top entrance for receiving seeds from a seed meter;
- a bottom exit through which seeds are discharged into a furrow in the ground; and
- a front wall between the top entrance and the bottom exit;
- wherein said front wall has a locator structure comprising a raised ring segment molded on the exterior surface of the front wall for locating a sensor component, said raised ring segment having an egress opening at a bottom side thereof that helps prevent shrinkage and sink formation on the interior surface of the front wall; and
- wherein said front wall has upper and lower sensor mount tabs molded on the exterior surface of the front wall above and below the raised ring segment, respectively, to support and center the sensor component, said sensor mount tabs comprising a plurality of protrusions formed on right and left sides of the seed tube that are not connected with each other and do not form a closed geometric shape.

11. A seed tube and sensor assembly for an agricultural planter, comprising:
- a seed tube having a top entrance for receiving seeds from a seed meter, a bottom exit through which seeds are discharged into a furrow in the ground, front and rear walls between the top entrance and the bottom exit, and sidewalls connecting the front and rear walls, and said front wall comprises a smooth, uninterrupted, sink-free interior surface formed of a transparent material; and
- a first sensor component positioned on a front side of the seed tube, said first sensor component having a light transmitter or light receiver arranged to face an exterior surface of the front wall for transmitting or receiving light through the front wall to detect seeds passing through said seed tube.

12. The seed tube and sensor assembly according to claim 11, further comprising a lower seed tube locator that fits around the main body of the seed tube as a separate component and provides a lower attachment point for the seed tube.

13. The seed tube and sensor assembly according to claim 12, wherein said lower seed tube locator comprises a metallic band that fits around a main body of the seed tube and has a positioning element that mates with a corresponding element on the rear wall of the seed tube to secure the seed tube locator in a desired position.

14. The seed tube and sensor assembly according to claim 13, wherein said metallic band has an open front side that allows the metallic band to be spread resiliently during assembly and to squeeze the seed tube main body after assembly, and wherein hooks are formed at respective free ends of the metallic band and protrude in front of said front wall and open downwardly to receive a corresponding positioning element on a planter.

15. The seed tube and sensor assembly according to claim 11, wherein said front wall, said sidewalls, and at least a lower portion of said rear wall are integrally molded of a transparent material to form a main body of the seed tube.

16. The seed tube and sensor assembly according to claim 11, wherein a second sensor component is positioned on a rear side of the seed tube, said second sensor component having a light transmitter or light receiver arranged to face the first sensor component for transmitting or receiving light through the front wall.

17. The seed tube and sensor assembly according to claim 11, wherein said transparent material is transparent to infrared light but not to light in the visible portion of the electromagnetic spectrum.

18. The seed tube and sensor assembly according to claim 11, wherein said front wall is free of any substantial molded structures protruding from an exterior surface of the front wall that would tend to create a sink or warp the interior surface of the front wall during molding.

19. The seed tube and sensor assembly according to claim 11, wherein said front wall has a sensor locator structure comprising a raised ring segment molded on the exterior surface of the front wall for locating a sensor component, said raised ring segment defining a transparent area through which light can be transmitted or received by a sensor component to detect seeds passing through the seed tube, and said raised ring segment having an egress opening at a bottom side thereof that helps prevent shrinkage and sink formation on the interior surface of the front wall.

20. The seed tube and sensor assembly according to claim 19, wherein said front wall has upper and lower sensor mount tabs molded on the exterior surface of the front wall above and below the raised ring segment, respectively, to support and center the sensor component, said sensor mount tabs comprising a plurality of protrusions formed on right and left sides of the seed tube that are not connected with each other and do not form a closed geometric shape.

21. An agricultural planter, comprising:
- a seed metering mechanism for metering seeds from a seed supply;
- a furrow opener for creating a furrow in the ground;
- a seed tube having a top entrance arranged to receive seeds from the seed metering mechanism, and a bottom exit through which seeds are discharged into the furrow created by the furrow opener, said seed tube being arranged to slope downwardly and rearwardly from the top entrance so that the bottom exit is located below and behind the top entrance; and first and second sensor components positioned on front and rear sides of the seed tube, respectively, for transmitting and receiving light through the seed tube to detect seeds passing through the seed tube;

wherein said seed tube has a front wall comprising a smooth, uninterrupted, sink-free interior surface formed of a transparent material, and said first sensor component has a light transmitter or light receiver arranged to face an exterior surface of the front wall for transmitting or receiving light through the front wall without disruption to the seeds passing through the seed tube.

22. The agricultural planter according to claim 21, further comprising a lower seed tube locator that fits around the main body of the seed tube as a separate component and provides a lower attachment point for the seed tube.

* * * * *